US009991570B2

(12) United States Patent
Tanaka et al.

(10) Patent No.: US 9,991,570 B2
(45) Date of Patent: Jun. 5, 2018

(54) BATTERY PACK TEMPERATURE REGULATING APPARATUS

(71) Applicant: MITSUBISHI JIDOSHA KOGYO KABUSHIKI KAISHA, Tokyo (JP)

(72) Inventors: Naoya Tanaka, Tokyo (JP); Eiji Nomura, Tokyo (JP); Naoki Taniguchi, Tokyo (JP); Kazuhisa Akita, Tokyo (JP); Shigeharu Ishii, Tokyo (JP); Sho Sugiura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 14/556,844

(22) Filed: Dec. 1, 2014

(65) Prior Publication Data

US 2015/0263398 A1 Sep. 17, 2015

(30) Foreign Application Priority Data

Mar. 11, 2014 (JP) ................................. 2014-047607

(51) Int. Cl.
*B60H 1/32* (2006.01)
*H01M 10/625* (2014.01)
*H01M 10/615* (2014.01)
*H01M 10/6561* (2014.01)
(Continued)

(52) U.S. Cl.
CPC ....... *H01M 10/625* (2015.04); *H01M 10/613* (2015.04); *H01M 10/615* (2015.04); *H01M 10/6561* (2015.04); *H01M 10/6571* (2015.04); *H01M 2220/20* (2013.01)

(58) Field of Classification Search
CPC ............. H01M 10/625; H01M 10/613; H01M 2220/20; H01M 2/1077; H01M 10/647; H01M 10/6551; H01M 10/615; H01M 10/63; H01M 10/60; H01M 10/663; H01M 6/5038; H01M 8/0267; H01M 8/04007; H01M 8/04037; H01M 8/04067; H01M 8/04074; H01M 10/61; H01M 10/617; H01M 10/653; B60L 11/1874; B60L 11/1875; B60H 1/00278; B60K 11/06

See application file for complete search history.

(56) References Cited

U.S. PATENT DOCUMENTS 7,045,236 B1 * 5/2006 Andrew ............... H01M 2/1077
429/83
8,403,029 B2 * 3/2013 Nanaumi ........... B60H 1/00028
165/41

(Continued)

FOREIGN PATENT DOCUMENTS

JP    9-123748 A    5/1997
JP    2010-285110 A    12/2010
(Continued)

*Primary Examiner* — Grant Moubry
*Assistant Examiner* — Miguel A Diaz
(74) *Attorney, Agent, or Firm* — Birch, Stewart, Kolasch & Birch, LLP

(57) ABSTRACT

A battery pack temperature regulating apparatus includes an evaporator configured to cool air inside a battery casing receiving a battery used for driving a vehicle; an evaporator casing receiving the evaporator; and a heater attached to the evaporator casing and configured to heat the air inside the battery casing.

13 Claims, 5 Drawing Sheets

(51) Int. Cl.
*H01M 10/613* (2014.01)
*H01M 10/6571* (2014.01)

(56) References Cited

U.S. PATENT DOCUMENTS

| | | | | |
|---|---|---|---|---|
| 8,408,980 B2* | 4/2013 | Nanaumi | B60H 1/00564 | 454/121 |
| 8,486,552 B2* | 7/2013 | Koetting | H01M 10/6556 | 429/120 |
| 8,820,455 B2* | 9/2014 | Nitawaki | B60L 11/1874 | 180/68.5 |
| 8,859,126 B2* | 10/2014 | Yamada | B60K 1/04 | 429/100 |
| 9,073,498 B2* | 7/2015 | Lee | B60R 16/04 | |
| 9,160,042 B2* | 10/2015 | Fujii | B60K 1/04 | |
| 9,379,420 B2* | 6/2016 | Ketkar | H01M 10/6569 | |
| 9,564,664 B2* | 2/2017 | Tanigaki | H01M 10/625 | |
| 9,742,043 B2* | 8/2017 | Tanigaki | H01M 10/625 | |
| 2002/0034682 A1* | 3/2002 | Moores, Jr. | B25F 5/008 | 429/120 |
| 2004/0058233 A1* | 3/2004 | Hamada | H01M 2/1022 | 429/159 |
| 2008/0251246 A1* | 10/2008 | Ohkuma | B60K 1/04 | 429/120 |
| 2009/0008060 A1* | 1/2009 | Robinet | B60H 1/246 | 165/41 |
| 2009/0253029 A1* | 10/2009 | Inoue | H01M 2/0237 | 429/71 |
| 2011/0005731 A1* | 1/2011 | Nanaumi | B60H 1/00028 | 165/121 |
| 2011/0009043 A1* | 1/2011 | Nanaumi | B60H 1/00564 | 454/121 |
| 2011/0297467 A1* | 12/2011 | Iwasa | B60K 1/04 | 180/65.31 |
| 2011/0297469 A1* | 12/2011 | Usami | B60K 1/04 | 180/68.5 |
| 2012/0018238 A1* | 1/2012 | Mizoguchi | B60K 1/04 | 180/68.5 |
| 2012/0055913 A1* | 3/2012 | Huang | B60S 1/488 | 219/202 |
| 2012/0107663 A1* | 5/2012 | Burgers | F28F 3/06 | 429/120 |
| 2012/0321927 A1* | 12/2012 | Loo | B60K 1/04 | 429/100 |
| 2013/0192914 A1* | 8/2013 | Nakamori | B60K 1/04 | 180/68.5 |
| 2013/0202936 A1* | 8/2013 | Kosaki | H01G 9/155 | 429/99 |
| 2013/0241493 A1* | 9/2013 | Kosaki | B60K 1/04 | 320/128 |
| 2013/0266840 A1* | 10/2013 | Fujii | H01M 2/1077 | 429/120 |
| 2013/0298586 A1* | 11/2013 | Hwang | B60K 1/04 | 62/239 |
| 2014/0069113 A1* | 3/2014 | Oh | B60L 1/003 | 62/3.3 |
| 2014/0193694 A1* | 7/2014 | Hoshi | H01M 2/1077 | 429/151 |
| 2014/0315064 A1* | 10/2014 | Katayama | B60K 1/04 | 429/120 |
| 2015/0010782 A1* | 1/2015 | Tanigaki | H01M 10/625 | 429/7 |
| 2015/0010795 A1* | 1/2015 | Tanigaki | H01M 10/625 | 429/83 |
| 2015/0037646 A1* | 2/2015 | Wyatt | H01M 10/6551 | 429/120 |
| 2015/0037647 A1* | 2/2015 | Nguyen | H01M 10/625 | 429/120 |
| 2015/0147618 A1* | 5/2015 | Nakamori | B60K 1/04 | 429/96 |
| 2015/0255838 A1* | 9/2015 | Inoue | H01M 10/6565 | 429/62 |
| 2015/0291019 A1* | 10/2015 | Hatta | B60K 11/06 | 180/68.2 |
| 2016/0093929 A1* | 3/2016 | Obasih | H01M 10/5067 | 429/120 |
| 2016/0233563 A1* | 8/2016 | Oshima | H01M 10/625 | |
| 2017/0018745 A1* | 1/2017 | Nakamori | H01M 2/043 | |

FOREIGN PATENT DOCUMENTS

| | | | | |
|---|---|---|---|---|
| JP | 2011-60733 A | | 3/2011 | |
| JP | 2014213671 A | * | 4/2013 | ............ B60H 1/00 |
| JP | 2013-171663 A | | 9/2013 | |
| JP | 2014213671 A | * | 11/2014 | |

* cited by examiner

BATTERY PACK TEMPERATURE REGULATING APPARATUS

CROSS-REFERENCE TO THE RELATED APPLICATION

This application incorporates by reference the subject matter of Application No. 2014-047607 filed in Japan on Mar. 11, 2014 on which a priority claim is based under 35 U.S.C. § 119(a).

FIELD

The present invention relates to a battery pack temperature regulating apparatus that cools and heats a driving battery of a vehicle.

BACKGROUND

The fact has been known that temperatures of batteries during their operations may affect their lifetime and charge-discharge efficiencies. More specifically, elevated temperatures accelerate breakdown of electrolytes in a battery and may shorten the lifetime of the battery due to deterioration, whereas lowered temperatures depress reactivity of the electrodes and may worsen the charge-discharge efficiency. For preventing any reduction in the lifetime or degradation of the charge-discharge efficiency, it is of an importance to keep the temperature of a battery within its optimal temperature range.

In an electric vehicle, the temperature of a battery may be elevated due to heat generation during repeated charge-discharge cycles in the battery, and one known strategy for controlling the battery temperature is to provide an evaporator within a casing receiving the battery, such that the evaporator cools the air inside the casing. The air cooled by the evaporator is circulated through the casing and removes heat from the battery, thereby cooling the battery to its optimal temperature.

In contrast, in electric vehicles tailored to cold climate areas (hereinafter, such vehicles may also be referred to as "cold-climate vehicles"), for example, a battery may be cooled below its optimal temperature range when the vehicle is powered off. Hence, in some electric vehicle tailored to cold climate areas, the battery shall be heated up to its optimal temperature when the temperature of the battery is low.

As an example, Patent Literature 1 (Japanese Laid-Open Patent Application No. 2010-285110) discloses a technique for increasing a temperature of a battery by repeating alternative discharge and charge of the battery, when the battery temperature is lower than a predetermined value. As another example, Patent Literature 2 (Japanese Laid-Open Patent Application No. 2013-171663) discloses a technique for heating a battery with a heater provided within a casing receiving the battery by heating the air inside the casing using that heater. Such a heater may be employed to increase the battery temperature in a short time.

Unfortunately, as discussed in Patent Literature 2, for example, provision of a heater requires extra parts used for attaching the heater to the casing and extra space used for receiving the heater inside the casing. Hence, providing a heater to a cold-climate vehicle requires redesign of the casing and additional parts for attaching the heater, which increases the manufacturing cost. Furthermore, battery heaters are not parts for standard vehicles which are not tailored to cold climate areas (hereinafter, such vehicles may also be referred to as "standard vehicles"), but are parts optional to cold-climate vehicles. It is therefore difficult to use common parts in both vehicles with and without in-casing heaters, and to improve the efficiency of the assembly.

SUMMARY

Technical Problems

An object of the present disclosure, which has been conceived of in light of the problems described above, is to provide a battery pack temperature regulating apparatus that can facilitate the assembly, while enabling reduction in the manufacturing-related costs. Another object of the present disclosure is to provide advantageous effects that are derived from the individual features described in the Description of Embodiment below but not from conventional techniques.

Solution to Problems (1) A battery pack temperature regulating apparatus includes an evaporator configured to cool air inside a battery casing receiving a battery used for driving a vehicle; an evaporator casing receiving the evaporator; and a heater attached to the evaporator casing and configured to heat the air inside the battery casing.

(2) Preferably, the heater is provided on an upper face section of the evaporator casing, and a duct extending from the evaporator casing to the battery, is attached to the upper face section.

(3) Preferably, the heater includes a rib-shaped guide protruding in a width direction of the heater, and the guide fits into a groove provided in the evaporator casing.

(4) Preferably, the evaporator casing includes a plurality of supports extending in a direction transversing a passage of the air, and the heater is placed on the supports.

(5) Preferably, the supports are formed in a U shape including a lower support configured to be in contact with a lower face section of the heater, and a pair of side supports configured to be in contact with side sections of the heater.

(6) Preferably, the evaporator casing includes a pair of nails extending along side sections of the heater, and being elastically deformable in a direction such that the nails separate from each other, and each of the pair of nails includes an arm configured to apply an elastic force to side sections of the heater so as to clamp the heater, and a tip protruding from the arm toward each other so as to lock the heater.

(7) Preferably, conduits configured to direct a coolant inside the evaporator casing, are received in the evaporator casing while being aligned with the evaporator in a horizontal direction, the evaporator is configured to cool the air inside the battery casing by transferring heat between the coolant and air within the evaporator casing, and the heater is located above locations where the conduits are located.

Advantageous Effects

In accordance with disclosed battery pack temperature regulating apparatus, since the heater configured to heat the air inside the battery casing is attached to the evaporator casing, a common part can be used in both vehicles with and without in-casing heaters. The manufacturing-related costs incurred by the provision of the heater, therefore, can be reduced.

Furthermore, since the heater is attached to the evaporator casing, the heater can be easily assembled into the battery casing. This results in a reduction of the assembly time.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

A battery pack temperature regulating apparatus as an embodiment will be described with reference to the drawings. It is to be noted that embodiments described below are merely exemplary and it is not intended to eliminate various modifications and applications that are not explicitly described in the embodiments. Configurations of the present embodiment may be varied in various manners, or may be selected or omitted where appropriate, or may be combined, without departing from the spirit of these embodiments.

1. Configurations (1-1. Configuration of Battery Pack)

Figure 2:
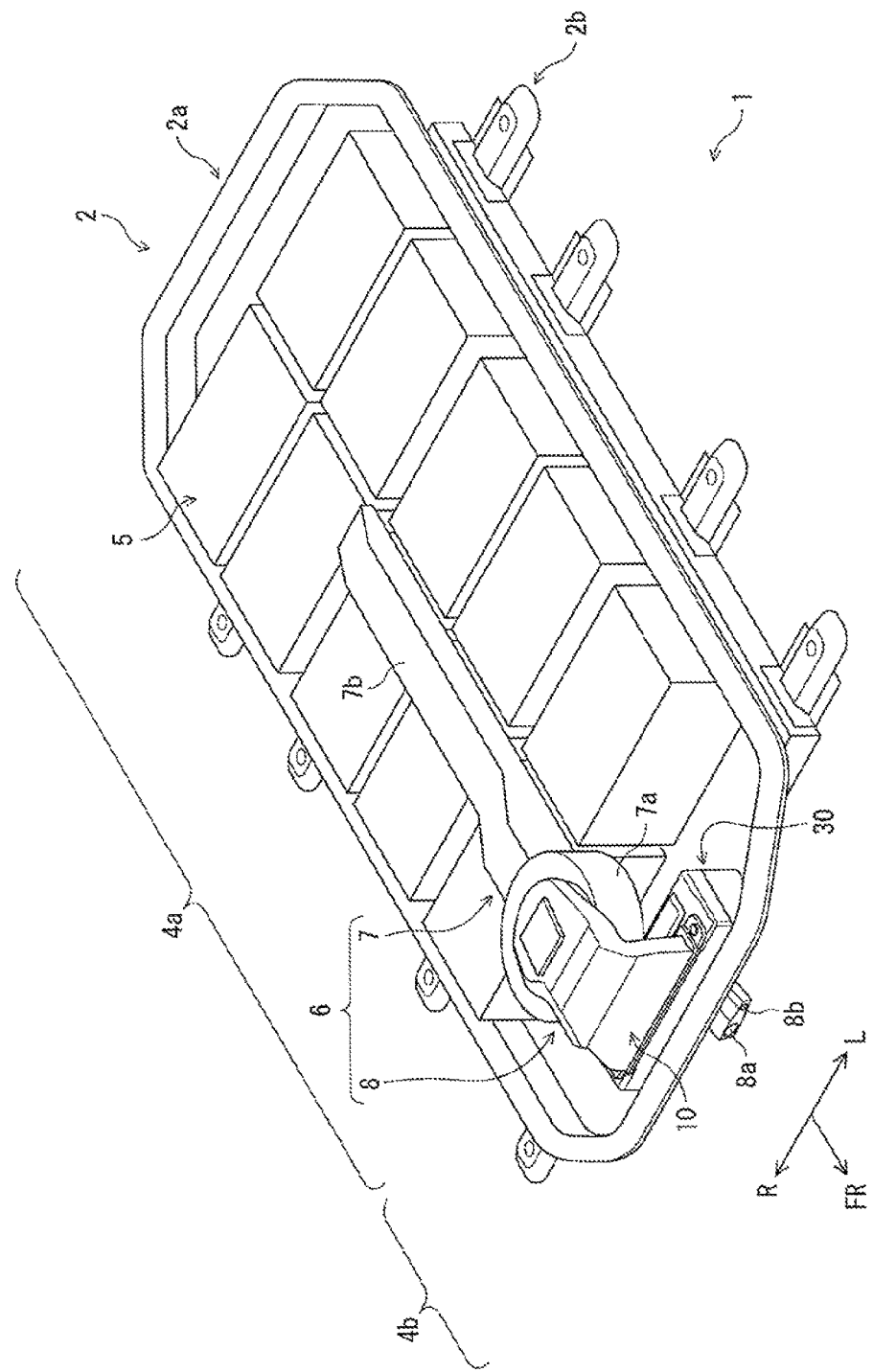
FIG. 2 is a perspective view of battery pack to which the battery pack temperature regulating apparatus in FIG. 1 is applied, with a cover member being removed.

A battery pack temperature regulating apparatus (hereinafter, also referred to as "temperature regulating apparatus") 8 in accordance with the present embodiment may be applied to a battery pack 1 illustrated in FIG. 2. The battery pack 1 is provided in an electric vehicle and functions as a power source of a motor (not illustrated) that drives the vehicle.

The battery pack 1 includes a plurality of battery modules 5 (in FIG. 2, one of which is referenced to by the reference symbol), which construct a battery used for driving the vehicle, a tray member 2a that supports the battery modules 5, and a cover member (not illustrated) that is placed on and is coupled to the tray member 2a.

Each of the battery modules 5 includes a plurality of battery cells (not illustrated) that are connected in series to form a single unit. Each battery cell is configured from lithium-ion battery, for example. The tray member 2a and the cover member together form a battery casing 2 which receives the battery modules 5. It is to be noted that the battery casing 2 is provided with a plurality of coupling sections 2b (in FIG. 2, one of which is referenced to by the reference symbol), extending outwardly from the tray member 2a. The coupling sections 2b are to be coupled to a structural members of the vehicle body, such that the battery pack 1 is secured to the vehicle body.

Inside the battery casing 2, provided are a battery chamber 4a that provides space used for receiving the battery modules 5, and a temperature regulating chamber 4b that provides space used for receiving a temperature regulating unit 6 that regulates the temperature of the battery modules 5. As illustrated, the battery chamber 4a is provided at the rear in the vehicle front-rear direction of the battery pack 1, whereas the temperature regulating chamber 4b is provided at the front in the vehicle front-rear direction of the battery pack 1. It is to be noted that the inner space of the battery casing 2 is substantially sealed when the tray member 2a and the cover member are coupled together.

The battery chamber 4a is provided with the plurality of the battery modules 5 arranged in a matrix, in both the vehicle-width (vehicle left-right) and vehicle-length (vehicle front-rear) directions. These battery modules 5 are electrically connected in series, and together function as a high-voltage power source used to drive the motor in the vehicle.

The temperature regulating chamber 4b is provided with the temperature regulating unit 6 including the temperature regulating apparatus 8 configured to cool or heat the air inside the battery casing 2, and a blowing device 7 configured to direct the air cooled or heated by the temperature regulating apparatus 8 to the battery modules 5 in the battery chamber 4a. The temperature regulating apparatus 8 is connected to coolant conduits 39a and 39b (see FIG. 3) configured to introduce and exhaust, into and from the temperature regulating apparatus 8, a coolant supplied from an air-conditioning unit of the vehicle compartment. These conduits 39a and 39b are connected to an inlet 8a and an outlet 8b illustrated in FIG. 2.

The blowing device 7 includes a blower fan (not illustrated) configured to generate a flow of the air to be directed to the battery modules 5, a fan casing 7a receiving the blower fan, and a fan duct 7b that defines an air passage from the blower fan to the battery chamber 4a. The fan duct 7b extends to the substantial center of the battery chamber 4a, and allows the air cooled or heated by the temperature regulating apparatus 8 to flow above the battery modules 5.

(1-2. Configuration of Temperature Regulating Apparatus)

Figure 1:
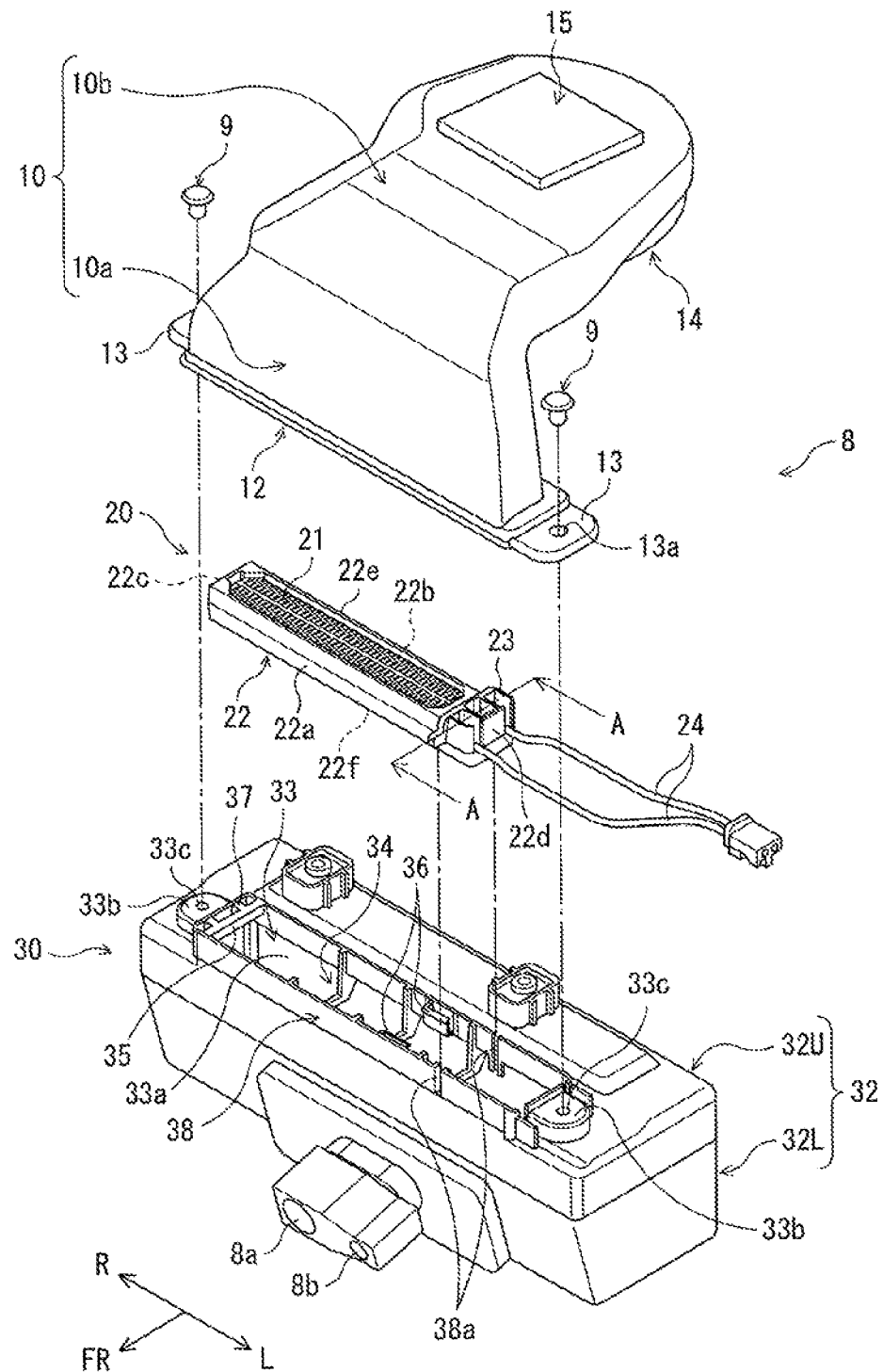
FIG. 1 is a perspective exploded view of a battery pack temperature regulating apparatus in accordance with an embodiment.

As depicted in FIG. 1, the temperature regulating apparatus 8 includes an evaporator duct (hereinafter, simply referred to as "duct") 10, a heater 20, and an evaporator assembly 30. Although the temperature regulating apparatus 8 illustrated in FIG. 1 includes the heater 20 that is typically applied to an electric vehicle tailored to cold climate areas, by omitting the heater 20, the temperature regulating apparatus 8 may also be applied to standard vehicles which do not require the capability of rising the temperature of the battery modules 5. In other words, the common duct 10 and evaporator assembly 30 in the temperature regulating apparatus 8 may be used in both vehicles with and without in-casing heaters 20.

The temperature regulating apparatus 8 is configured to cool the air inside the battery casing 2 by using the evaporator assembly 30, and to heat the air by using the heater 20. The cooled or heated air is delivered from the evaporator assembly 30 to the blowing device 7, through the duct 10 extending toward the battery modules 5, and is supplied to the battery chamber 4a.

Here, the configurations of the duct 10, the heater 20, and the evaporator assembly 30 will be described, in this order.

(1-2-1. Duct)

The duct 10 defines an air passage between the evaporator assembly 30 and the blowing device 7. In this example, the duct 10 includes a duct upstream section 10a extending along the vertical direction, and a duct downstream section 10b extending along the vehicle-length direction, and is formed in a substantially L shape, when viewed from a side.

The duct upstream section 10a includes an upstream end 12 of the duct 10 provided at the lower end thereof, and a pair of flanges 13, 13 extending outwardly in the horizontal direction, from the upstream end 12. The upstream end 12 includes a rectangular opening on a substantially horizontal plane, and is positioned to cover the outer periphery of the heater 20 so as to direct the air coming through the heater 20, to the duct 10.

Each flange 13 has a hole 13a through which a securing member 9 is to be inserted such that the duct 10 is secured to the evaporator assembly 30. The two holes 13a are positioned so as to sandwich the heater 20 therebetween, in the longitudinal direction of the upstream end 12. The securing members 9 are to be inserted through the respective holes 13a, and thereby secure each flange 13 to an upper face section 33 of the evaporator assembly 30 (which corresponds to a "casing upper face section" described later).

The duct downstream section 10b includes a downstream end 14 defining the rear end of the duct downstream section 10b. The downstream end 14 is to be secured to the fan casing 7a of the blowing device 7 so as to cover the fan casing 7a, and connects the inner space of the duct 10 to the inner space of the fan casing 7a. On the upper face of the duct downstream section 10b, a pad member 15 is to be secured. The pad member 15 is configured to contact the lower face of the cover member of the battery casing 2.

(1-2-2. Heater)

The heater 20 is configured to heat the air inside the battery casing 2 when the temperature of the battery modules 5 is low, and includes a heat-generating body 21 that generates a heat when being energized, and a heater casing 22 provided so as to surround the heat-generating body 21. The heater 20 has a horizontally-elongated substantially rectangular parallelepiped shape, for example, and its longitudinal direction is to extend in the vehicle-width direction, and is to be attached to the upper face section 33 of the evaporator assembly 30.

The heat-generating body 21 is configured to have a positive temperature coefficient (PTC) characteristic. In other words, the heat-generating body 21 has a characteristic (self-temperature controlling characteristic) wherein an increase in the temperature is suppressed in response to a reduction in an electric current being consumed due to a rise in the temperature.

The heater casing 22 has a horizontally-elongated substantially rectangular parallelepiped shape having a space formed therethrough in the vertical direction. This space formed through the heater casing 22 in the vertical direction, functions as the space used for receiving the heat-generating body 21 and as a passage of the air.

The heater casing 22 includes four side sections (side sections of the heater 20) 22a-22d extending on the vertical plane and being formed from substantially rectangular-shaped front and rear face sections 22a and 22b extending in the vehicle-width direction; a substantially square-shaped right face section 22c extending in the vehicle front-rear direction; and a left face section 22d that holds lead wires 24 used for supplying an electric power to the heat-generating body 21. Furthermore, the heater casing 22 includes an upper face section 22e (upper face section of the heater 20) and a lower face section 22f (lower face section of the heater 20) each formed in a frame-shape surrounding the rectangle.

The heater casing 22 includes rib-shaped guides 23, 23 extending frontwardly and rearwardly, from the front face section 22a and the rear face section 22b, respectively, so as to protrude in the width direction of the heater casing 22. The guides 23 are used as guides to position the heater 20 relative to the evaporator assembly 30 when the heater 20 is to be attached. Once the heater 20 is attached, the guides 23 restrict a displacement of the heater 20.

The two guides 23, 23 are arranged equally in the vehicle-width direction, so as to form a straight line extending in the vehicle front-rear direction, when viewed from the top.

Furthermore, each guide 23 is formed at a displaced position from both the longitudinal-directional center and the vertical-directional center, of the heater 20 (at a position displaced upwardly and leftwardly from the center of the heater 20, in this example). In other words, the guides 23 are placed so as to make the heater 20 asymmetric in its vertical and longitudinal directions.

In the configuration where the heater 20 is attached to the upper face section 33 of the evaporator assembly 30, the guides 23 of the heater 20 are fitted into grooves 38a (described later) in the evaporator assembly 30. This restricts a vehicle-width directional displacement of the heater 20.

Figure 3:
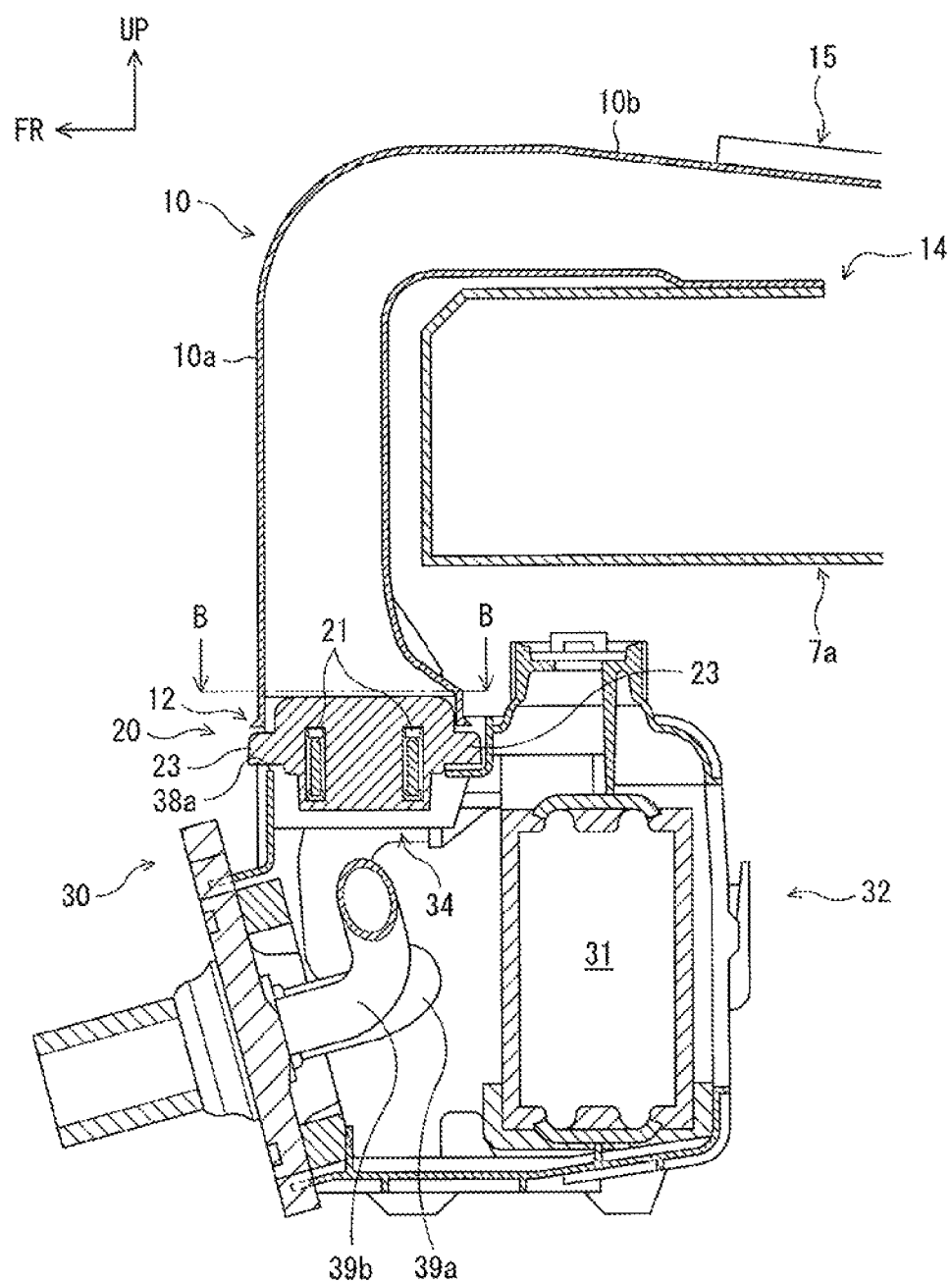
FIG. 3 is a cross-sectional view taken along Arrow A-A in FIG. 1, with the battery pack temperature regulating apparatus in FIG. 1 being placed.

In contrast, in the configuration where the duct 10 is attached to the evaporator assembly 30, as illustrated in FIG. 3, the guides 23 are positioned proximal to the upstream end 12 of the duct 10, with some spacing defined therebetween. This restricts an upward displacement of the heater 20.

(1-2-3. Evaporator Assembly)

The evaporator assembly 30 is configured to cool the air inside the battery casing 2 when the temperature of the battery modules 5 is elevated, and includes an evaporator main body (evaporator) 31 and an evaporator casing 32 that receives the evaporator main body 31.

The evaporator main body 31 is a heat exchanger configured to transfer heat between the coolant supplied through the conduits 39a and 39b and the air inside the battery casing 2. In this example, the evaporator main body 31 is configured to cool the air inside the battery casing 2 by reducing the pressure of the coolant passing therethrough to evaporate the coolant. The air cooled in evaporator main body 31 is supplied to the duct 10 via the heater 20.

The evaporator casing 32 receives the evaporator main body 31 and the conduits 39a and 39b aligned in the horizontal direction, and defines an air passage between the evaporator main body 31 and the duct 10. In this example, the conduits 39a and 39b are disposed on a front side of the evaporator main body 31, and the heater 20 is disposed above the conduits 39a and 39b. Specifically, the heater 20 is located above locations on a side where the conduits 39a and 39b are disposed relative to the evaporator main body 31, and the heater 20 and the evaporator main body 31 are arranged so as not to overlap when viewed from the top.

As illustrated in FIG. 1, the evaporator casing 32 includes an upper casing 32U and a lower casing 32L, in this example. The lower casing 32L is formed in a horizontally-elongated boxed shape having an opening formed on its top, and is disposed such that the longitudinal direction thereof extends in the vehicle-width direction. The upper casing 32U is positioned so as to cover the opening of the lower casing 32L and to be coupled to the lower casing 32L.

The heater 20 and the duct 10 are placed on the upper face section 33 of the upper casing 32U (which also defines the upper face section of the evaporator assembly 30, and thereinafter the upper face section 33 is referred to as the "casing upper face section 33"). Specifically, the heater 20 is provided in the positions where the evaporator casing 32 and the duct 10 are attached to each other.

The casing upper face section 33 includes an opening 33a that functions as the passage of the air passed through the evaporator main body 31, and securing portions 33b on which the flanges 13 of the duct 10 are to be placed and secured thereto. Each securing portion 33b has a hole 33c to which a securing member 9 is to be inserted.

The opening 33a is a space surrounded by a wall 38 extending in a substantially vertical direction, and is formed in a rectangular shape that has a perimeter greater than that of the heater 20, when viewed from the top. The heater 20 is placed inside the wall 38 and is then secured.

The grooves 38a are formed in the wall 38, into which the guides 23 of the heater 20 are to be fitted. In this example, two grooves 38a, 38a are formed corresponding to the respective positions and sizes of the guides 23, 23, and are arranged equally in the vehicle-width direction.

Furthermore, the wall 38 includes a plurality of supports 34 (in FIG. 1, one of which is referenced to by the reference symbol), extending in the direction transversing the opening 33a (in this example, the vehicle front-rear direction); a pair of nails 36, 36 extending along the front and rear face sections 22a and 22b of the heater 20; a rod-shape beam 35 extending in the same direction as the supports 34 (the vehicle front-rear direction in this example); and protrusions 37 that are to contact the right face section 22c of the heater 20.

Figure 4:
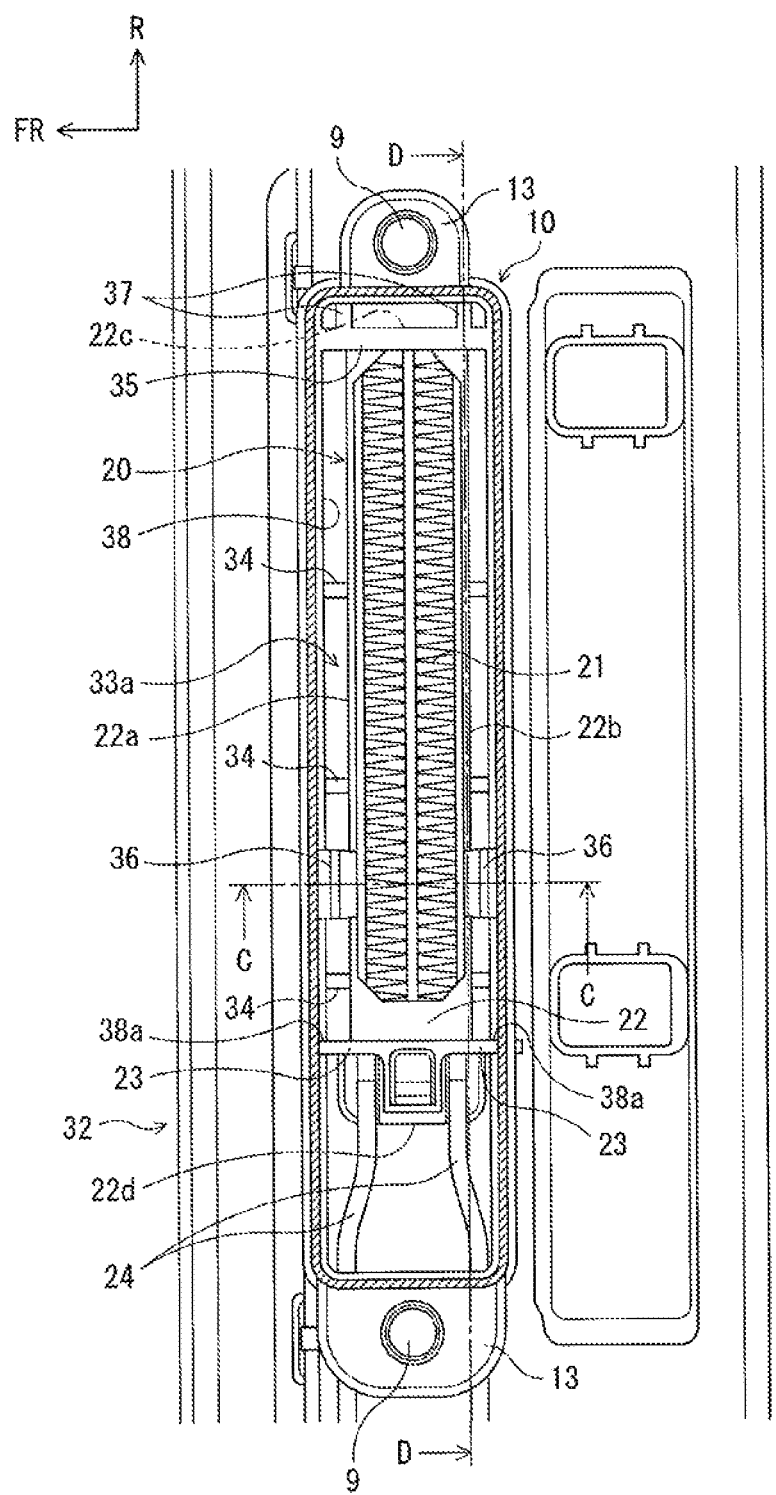
FIG. 4 is a cross-sectional view taken along Arrow B-B in FIG. 3, illustrating the main section of the battery pack temperature regulating apparatus in FIG. 3.

In this example, three supports 34 are provided so as to be spaced apart from each other at a substantially equal distance in the vehicle-width direction, as illustrated in FIG. 4. Furthermore, in this example, the beam 35 is positioned in the right side of the opening 33a, while the nails 36, 36 are positioned in the left side of the opening 33a.

Figure 5:
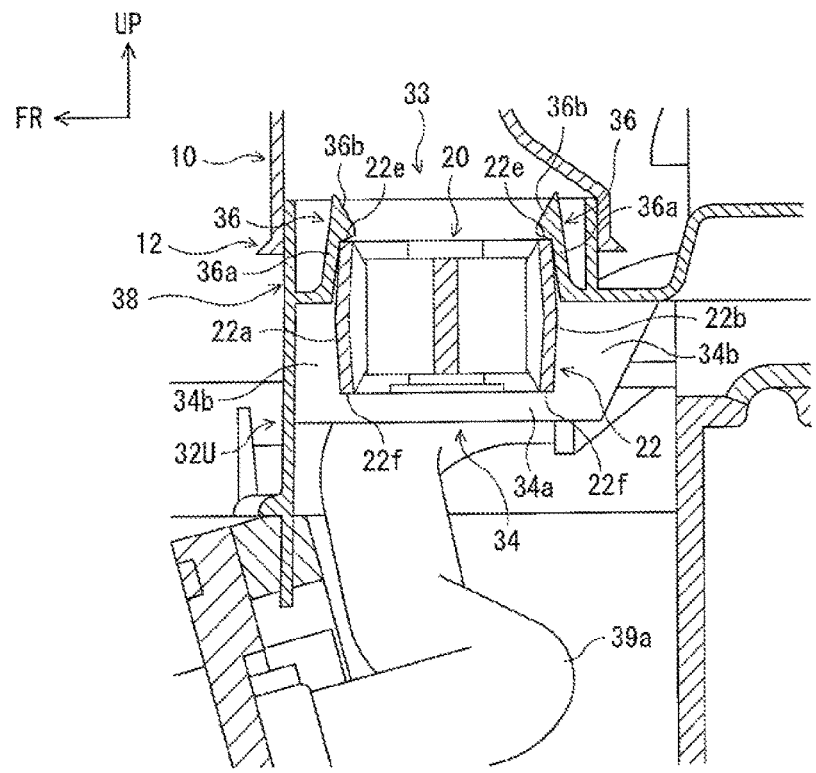
FIG. 5 is a cross-sectional view taken along Arrow C-C in FIG. 4, illustrating the main section of the battery pack temperature regulating apparatus in FIG. 4.

As illustrated in FIG. 5, the supports 34 are planer members extending downwardly from the wall 38. When the heater 20 is attached, the supports 34 support the heater 20. Each support 34, in this example, is formed in a U shape, having a lower support 34a configured to be in contact with the lower face section 22f of the heater 20, and a pair of side support 34b, 34b configured to be in contact with the front and rear face sections 22a and 22b, respectively, of the heater 20. Specifically, when the heater 20 is placed on the supports 34, the lower supports 34a support the heater 20 from below, and the side supports 34b restrict a displacement of the heater 20 in the vehicle front-rear direction.

Inside the wall 38, the nails 36 extend substantially parallel to the wall 38. The nails 36, 36 are spaced apart from each other, in the vehicle front-rear direction, at a distance slightly smaller than the size of the heater 20, in the width direction (vehicle front-rear direction in this case), and are formed so as to be elastically deformable in a direction such that the nails 36, 36 separate from each other.

Each of the nails 36 includes an arm 36a extending upward from the lower end of the wall 38, and a tip 36b protruding inwardly from the arm 36a to the opening 33a. In this example, the tips 36b protrude in the vehicle front-rear direction, toward each other from the respective arms 36a.

The heater 20 is to be placed between the pair of nails 36 from above, and is to be attached to the casing upper face section 33 with the nails 36 being elastically deformed. In this configuration, the arms 36a of the nails 36 apply an elastic force to the front and rear face sections 22a and 22b of the heater 20, thereby clamping the heater 20 so as to hold the heater 20 in the vehicle front-rear direction. Also in this configuration, the tips 36b of the nails 36 contact the upper face section 22e of the heater 20, thereby restricting an upward displacement of the heater 20, and locking the heater 20 to the casing upper face section 33.

Figure 6:
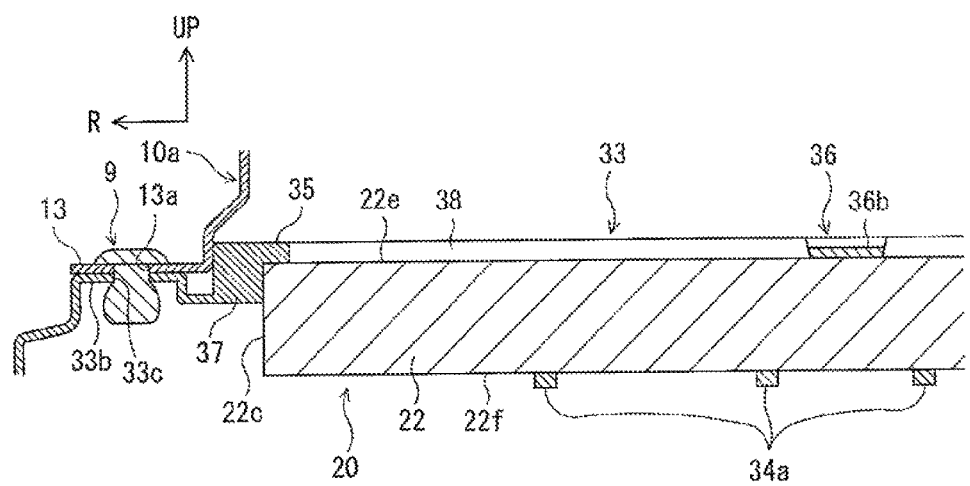
FIG. 6 is a cross-sectional view taken along Arrow D-D in FIG. 4, illustrating a support structure for a heater of the battery pack temperature regulating apparatus in FIG. 4.

As illustrated in FIG. 6, the beam 35 is provided in the upper portion of the wall 38, and is configured to contact the upper face section 22e of the heater 20, so as to restrict an upward displacement of the heater 20. Furthermore, when the heater 20 is to be attached to the casing upper face section 33, the protrusions 37 contact the right face section 22c of the heater 20, thereby restricting a vehicle-width directional position of the heater 20. In other words, with the right face section 22c being pressed against the protrusions 37, the heater 20 is placed in the vehicle-width directional position.

In the configuration that the heater 20 is attached to the casing upper face section 33, the beam 35, the lower supports 34a, and the tips 36b of the nails 36 restrict vertical displacements of the heater 20. Further, as illustrated in FIG. 5, the side supports 34b and the arms 36a of the nails 36 restrict vehicle-length directional displacements of the heater 20. Further, as illustrated in FIG. 3, the configurations of the guides 23 fitted into the grooves 38a in the wall 38 and the right face section 22c pressed against the protrusions 37 restrict vehicle-width directional displacements of the heater 20.

2. Advantageous Effects (1) In accordance with the temperature regulating apparatus 8 described above, since the heater 20 that heats the air inside the battery casing 2 is attached to the evaporator casing 32, the same evaporator casing 32 can be used in both vehicles with and without in-casing heaters 20. The manufacturing-related costs incurred by the provision of the heater 20, therefore, can be reduced. Furthermore, an additional heater 20 can be easily provided to the battery pack 1 in standard electric vehicles that are not tailored to cold climate areas, for example. This improves the versatility and the adaptability of the component to any change in the operation environment.

Furthermore, since the heater 20 is attached to the evaporator casing 32, the heater 20 can be easily assembled in the battery casing 2. This reduces the assembly time. Consequently, the assembly efficiency and the productivity of the vehicles are enhanced, and the manufacturing-related costs can be reduced.

(2) Furthermore, in the temperature regulating apparatus 8 described above, the heater 20 is provided on the casing upper face section 33, and the duct 10 is attached to the casing upper face section 33. In other words, the heater 20 is provided in the position on the surface of the evaporator casing 32, to which the duct 10 is to be attached. This structure reduces the space required for receiving the heater 20 within the battery casing 2. Further, the air heated by the heater 20 can be directly guided to the duct 10.

Furthermore, as the temperature of the air heated by the heater 20 increases, the air expands at a constant pressure. As a result, the density of the air decreases, and the air flows upward. Advantageously, in accordance with the temperature regulating apparatus 8 described above, since the heater 20 and the duct 10 are attached to the casing upper face section 33, the air heated by the heater 20 is easily guided to the duct 10 located above.

Furthermore, in the temperature regulating apparatus 8 described above, since the heater 20 is provided on the casing upper face section 33, the heater 20 is placed above the evaporator main body 31. Hence, for example, when the evaporator main body 31 is provided with a temperature sensor and wires connected to the sensor, the air heated by the heater 20 is prevented from unintendedly contacting and damaging the temperature sensor and the wires.

(3) Furthermore, in the temperature regulating apparatus 8 described above, the heater 20 includes rib-shaped guides 23, 23 protruding in the width direction of the heater 20. Since the guides 23, 23 protrude outwardly toward the opening 33*a* to which the heater casing 22 is to be attached, as illustrated in FIG. 3, the guides 23, 23 fit into the respective grooves 38*a* in the evaporator casing 32. This structure restricts a displacement of the heater 20 in the longitudinal direction (in the vehicle-width direction, in this case). This also prevents the heater 20 from being swung vibrantly and detached from the evaporator casing 32 while the vehicle is driven, for example, thereby preventing unintended heating of other components.

Furthermore, the guides 23 can be used to position the heater 20 when the heater 20 is to be attached to the evaporator casing 32. This facilitates easy and precise attachment of the heater 20 to the evaporator casing 32.

Further, in the temperature regulating apparatus 8 described above, the guides 23 are formed at displaced positions from both the longitudinal-directional center and the vertical-directional center of the heater casing 22. Accordingly, when the heater 20 is erroneously attached, with the left and right sides reversed (i.e., inversed in the longitudinal direction), or upside-down, the guides 23 would not fit into the grooves 38*a* and thus the misplacement is quite noticeable. This ensures that any misplacement of the heater 20 is prevented.

(4) Furthermore, the evaporator casing 32 described above includes the plurality of supports 34 extending in the direction transversing the air passage. Since the heater 20 is placed on the supports 34, the heater 20 is supported securely, and is therefore prevented from being fallen. Further, since the above-described supports 34 also extend so as to transverse the air passage, not merely protruding into the air passage, the rigidity of the supports 34 is improved. This ensures that any detachment of the supports 34 and resulting fall of the heater 20 are prevented.

(5) Furthermore, the above-described supports 34 include the pair of side supports 34*b* configured to be in contact with the side sections (the front face section 22*a* and the rear face section 22*b*) of the heater 20. Specifically, the pair of side support 34*b* are positioned so as to sandwich the heater 20 therebetween (between the front and rear sides in the vehicle front-rear direction). This restricts a displacement of the heater 20, and thus the heater 20 is prevented from being swung vibrantly and detached.

(6) Furthermore, the above-described evaporator casing 32 includes the pair of nails 36 elastically deformable in a direction such that they separate from each other. The respective arms 36*a* of the pair of nails 36 are configured to apply an elastic force to the side sections (the front face section 22*a* and the rear face section 22*b*) of the heater 20, so as to clamp the heater 20. This restricts a displacement of the heater 20.

Furthermore, the tips 36*b* of the pair of nails 36 protrude from the arm 36*a* toward each other, so as to lock the heater 20 on the evaporator casing 32. This restricts an upward displacement of the heater 20.

Accordingly, in the above-described nails 36, the pair of arms 36*a* restricts a displacement of the heater 20 in the vehicle front-rear direction, and the pair of tips 36*b* restricts an upward displacement of the heater 20. Therefore, the heater 20 is prevented from being swung vibrantly and detached.

(7) Furthermore, in the above-described evaporator casing 32, the conduits 39*a* and 39*b* configured to direct the coolant inside the evaporator casing 32, are aligned with the evaporator main body 31 in the horizontal direction, and the heater 20 is located above the locations where the conduits 39*a* and 39*b* are disposed. Hence, for example, when the evaporator main body 31 is provided with a temperature sensor and wires connected to the sensor, it is ensured that the air heated by the heater 20 is prevented from unintendedly contacting and damaging the temperature sensor and the wires. Furthermore, the space required for receiving the heater 20, the evaporator main body 31, and the conduits 39*a* and 39*b*, can be reduced.

Furthermore, in the temperature regulating apparatus 8 described above, the guides 23 of the heater 20 are positioned proximal to the upstream end 12 provided at the lower end of the duct 10. Accordingly, the upstream end 12 of the duct 10 restricts an upward displacement of the heater 20, and the heater 20 is prevented from being swung vibrantly and detached.

3. Modification

The invention should not be limited to the above-described embodiment and may be modified without departing from the spirit. The individual features of the present embodiment may be selectively employed as necessary or properly combined with one another.

For example, the structures and arrangements of the duct 10, the heater 20 and the evaporator casing 32 described above are merely exemplary, and are not limited to the structures and arrangements described above. The duct 10 is not limited to an L shape when viewed from one side, and may extend forming a straight or curved line, for example. Further, the heater 20 may be attached to a side section or an inside of the evaporator casing 32, for example, and the longitudinal direction thereof may extend the vehicle front-rear direction. Further, the duct 10 may be located in any positions other than the casing upper face section 33 in the above embodiment, as long as the duct 10 can intake the air coming through the evaporator assembly 30 and the heater 20.

Furthermore, although the conduits 39*a* and 39*b* are disposed on the front side of the evaporator main body 31 in the above-described embodiment, the arrangements of the conduits 39*a* and 39*b* may be not limited to this example. The conduits 39*a* and 39*b* may be located behind or side-by-side with the evaporator main body 31, while being aligned with the evaporator main body 31 in the horizontal direction, for example. In such a case, the heater 20 may also be located above the locations on the side where the conduits 39*a* and 39*b* are disposed with respect to the evaporator main body 31.

Furthermore, although heater 20 has been described as having a PTC characteristic, the heater 20 does not necessarily have the PTC characteristic as long as the heater 20 can heat the air inside the battery casing 2.

Furthermore, the two guides 23 of the heater 20 are formed so as to be arranged equally in the vehicle-width direction in the above-described embodiment. Alternatively, provision of at least one guide 23 may be suffice, and the number and the configuration of the guides 23 may be varied. Furthermore, provision of at least two supports 34 in the evaporator casing 32 may be suffice, and the particular configuration may be varied. Nevertheless, the plurality of supports 34 that are spaced apart from each other can support for the heater 20 more firmly.

REFERENCE SIGNS LIST

1 battery pack
2 battery casing
5 battery module (battery)
8 temperature regulating apparatus (battery pack temperature regulating apparatus)
10 duct (evaporator duct)
20 heater
23 guide
30 evaporator assembly
31 evaporator main body (evaporator)
32 evaporator casing
33 casing upper face section
34 support
34*a* lower support
34*b* side support
36 nail
36*a* arm
36*b* tip
38*a* groove
39*a*, 39*b* conduit The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A battery pack temperature regulating apparatus comprising:
   an evaporator configured to cool air inside a battery casing accommodating a battery therein used for driving a vehicle;
   an evaporator casing accommodating the evaporator therein;
   an opening provided on the evaporator casing and configured to function as a passage of air passed through the evaporator;
   a wall extending from the evaporator casing and surrounding the opening;
   at least one nail extending from the wall toward the opening, the at least one nail having a tip protruding towards a center of the opening from an end of the at least one nail;
   a support extending over the opening in a direction traversing a passage of air;
   a duct extending from the evaporator casing to the battery; and
   a heater placed in a space surrounded by the wall and attached to the evaporator casing, the heater being placed on the support and sandwiched between the tip and the support, the heater being configured to heat the air inside the battery casing.

2. The battery pack temperature regulating apparatus according to claim 1, wherein
   the opening is provided on an upper face section of the evaporator casing, and
   the duct is attached to the upper face section.

3. The battery pack temperature regulating apparatus according to claim 1, wherein
   the heater comprises a rib-shaped guide extending therefrom in a width direction of the heater, and
   the guide fits into a groove formed in the wall of the evaporator casing.

4. The battery pack temperature regulating apparatus according to claim 1, wherein
   the evaporator casing comprises a plurality of supports extending over the opening in a direction transversing a passage of the air.

5. The battery pack temperature regulating apparatus according to claim 4, wherein
   the supports are formed in a U shape comprising a lower support configured to be in contact with a lower face section of the heater, and a pair of side supports configured to be in contact with side sections of the heater.

6. The battery pack temperature regulating apparatus according to claim 1, further comprising:
   a pair of nails including the at least one nail, the pair of nails extends alongside sections of the heater, and being elastically deformable in a direction such that the nails separate from each other,
   wherein, each of the pair of nails comprises an arm configured to apply an elastic force to side sections of the heater so as to clamp the heater, and the tip protrudes from the arm toward each other so as to lock the heater.

7. The battery pack temperature regulating apparatus according to claim 1, wherein
   conduits configured to direct a coolant inside the evaporator casing, are received in the evaporator casing while being aligned with the evaporator in a horizontal direction,
   the evaporator is configured to cool the air inside the battery casing by transferring heat between the coolant and air within the evaporator casing, and
   the heater is located directly above locations where the conduits are located.

8. A battery pack temperature regulating apparatus comprising:
   an evaporator configured to cool air inside a battery casing accommodating a battery therein used for driving a vehicle;
   an evaporator casing accommodating the evaporator therein;
   a duct extending from the evaporator casing to the battery;
   an opening provided on the evaporator casing and configured to function as a passage of air passed through the evaporator, and
   a wall extending from the evaporator casing, surrounding the opening, and defining a space for accommodating a heater therein at a position where the evaporator casing and the duct are attached to each other,
   wherein the duct surrounds a perimeter of the heater and the wall from outside.

9. The battery pack temperature regulating apparatus according to claim 8, wherein
   the evaporator casing comprises a plurality of supports for placing the heater thereon, the supports extending over the opening in a direction transversing a passage of the air.

10. The battery pack temperature regulating apparatus according to claim 9, wherein
    the supports are formed in a U shape comprising a lower support configured to be in contact with a lower face section of the heater, and a pair of side supports configured to be in contact with side sections of the heater.

11. A battery pack temperature regulating apparatus comprising:
- an evaporator configured to cool air inside a battery casing accommodating a battery therein used for driving a vehicle;
- an evaporator casing accommodating the evaporator therein;
- a heater attached to the evaporator casing and configured to heat the air inside the battery casing; and
- a duct extending from the evaporator casing to the battery, is attached to an upper horizontal surface of the evaporator casing,
- wherein the evaporator casing defines an opening in the upper horizontal surface thereof and has a wall that extends in a vertical direction from the upper horizontal surface of the evaporator casing and surrounds the opening,
- wherein the heater is provided at a position higher than the evaporator, and
- wherein the duct surrounds a perimeter of the heater and the wall from outside.

12. The battery pack temperature regulating apparatus according to claim 1, wherein
- the tip is provided offset from the support in a longitudinal direction of the opening.

13. The battery pack temperature regulating apparatus according to claim 1, wherein
- the wall has a pair of opposing wall surfaces, and
- one end of the support is connected to one of the pair of opposing wall surfaces, and
- another end of the support is connected to the other one of the pair of opposing wall surfaces.

* * * * *